United States Patent [19]
Ein-Eli et al.

[11] Patent Number: 5,962,166
[45] Date of Patent: Oct. 5, 1999

[54] ULTRAHIGH VOLTAGE MIXED VALENCE MATERIALS

[75] Inventors: Yair Ein-Eli, Waltham, Mass.; Wilmont F. Howard, Jr., Edmond, Okla.

[73] Assignee: Covalent Associates, Inc., Woburn, Mass.

[21] Appl. No.: 09/074,819

[22] Filed: May 8, 1998

Related U.S. Application Data

[60] Provisional application No. 60/056,007, Aug. 18, 1997.

[51] Int. Cl.$^6$ .................................................. H01M 4/50
[52] U.S. Cl. ...................... 429/224; 429/231.1; 423/599
[58] Field of Search ................................. 429/218, 224, 429/218.1, 231.1; 423/599, 641

[56] References Cited

U.S. PATENT DOCUMENTS

| | | | |
|---|---|---|---|
| 5,605,773 | 2/1997 | Ellgen | 429/194 |
| 5,742,070 | 4/1998 | Hayashi et al. | 252/182.1 |

FOREIGN PATENT DOCUMENTS 2-139861  5/1990  Japan .

OTHER PUBLICATIONS

Sigala et al., "Positive electrode materials with high operating voltage . . . " Solid State Ionics, vol. 81, pp. 165–179, Nov. 1995.

Ein–Eli et al., "LiMn2–$x$Cu$x$O4 Spinels (0.1<x<0.5) . . . " J. Ekectrochem. Soc., vol. 145, pp. 1238–1244, Apr. 1998.

Ein–Eli et al., "LiCu$x$Cu$y$Mn(2–(x+y)O4: 5 V Cathode Materials", J. Electrochem Soc., vol. 144, p. L205, Aug. 1997.

Krutzsch et al., "Uber Das System . . . ", Journal of the Less Common Metals, vol. 124 pp. 155–164, Oct. 1986.

Le Cras et al., "Lithium intercalation in Li–Mg–Mn–O . . . ", Solid State Ionics, vol. 89, pp. 203–213, Aug. 1986.

*Primary Examiner*—Maria Nuzzolillo
*Assistant Examiner*—Carol Chaney
*Attorney, Agent, or Firm*—Weingarten, Schurgin, Gagnebin & Hayes LLP

[57] ABSTRACT

A series of electroactive insertion compounds, $LiM_y^{II}M_z^{II}$-$tMn_l^{III}Mn_q^{IV}O_4$ ($0<y+z\leq0.5$, $y+z+l+q=2$), where M=any transition metal or combination of metals, for application in non-aqueous batteries, capacitors, and superconducting materials, are disclosed. These newly synthesized compounds are unique in that they contain at least two mixed valence elements, thereby allowing the reversible intercalation of lithium cations at potentials near 4.7–5.1 V vs. lithium. Also disclosed are novel copper insertion compounds of the formula $LiM_yCu_{0.5-y}Mn_{1.5}O_4$ ($0\leq y\leq 0.49$), where M=one or more metals or transition metals. Such materials have also been found to be remarkably stable at this voltage upon repeated cycling.

15 Claims, 13 Drawing Sheets

ULTRAHIGH VOLTAGE MIXED VALENCE MATERIALS

CROSS REFERENCE TO RELATED APPLICATIONS

This application claims priority from U.S. Provisional Patent Application No. 60/056,007, filed Aug. 18, 1997, the entire disclosure of which is incorporated herein by reference.

STATEMENT REGARDING FEDERALLY SPONSORED RESEARCH OR DEVELOPMENT

Part of the work leading to this invention was carried out with United States government support provided under Department of Defense Contract No. DAA-B07-97-C-D-304. Therefore, the U.S. Government has certain rights in this invention.

BACKGROUND OF THE INVENTION

Insertion compounds are those that act as a host solid for the reversible insertion of guest atoms. Cathode materials that will reversibly intercalate lithium have been studied extensively in recent years for use as electrode materials in advanced high energy density batteries and form the cornerstone of the emerging lithium-ion battery industry. Lithium-ion batteries have the greatest gravimetric (Wh/kg) and volumetric (Wh/L) energy densities of presently available conventional rechargeable systems (i.e., NiCd, NiMH, or lead acid batteries) and represent a preferred rechargeable power source for many consumer electronics applications. Additionally, lithium ion batteries operate around 3.6 volts which is often sufficiently high such that a single cell can suffice for many electronics applications.

Lithium ion batteries use two different insertion compounds for the active cathode and anode materials. The excellent reversibility of lithium insertion makes such compounds function extremely well in rechargeable battery applications wherein over one thousand battery cycles can be obtained. In a lithium-ion battery, lithium is extracted from the anode material while lithium is concurrently inserted into the cathode on discharge of the battery. Lithium atoms travel or "rock" from one electrode to the other as ions dissolved in a non-aqueous electrolyte with the associated electrons traveling in the circuit external to the battery. Layered rock-salt compounds such as $LiCoO_2$ and $LiNiO_2$ (1,2) are proven cathode materials. Nonetheless, Co and Ni compounds have economic and environmental problems that leave the door open for alternative materials.

$LiMn_2O_4$ is a particularly attractive cathode material candidate because manganese is environmentally benign and significantly cheaper than cobalt and/or nickel. $LiMn_2O_4$ refers to a stoichiometric lithium manganese oxide with a spinel crystal structure. A spinel $LiMn_2O_4$ intercalation cathode is the subject of intense development work (3), although it is not without faults. The specific capacity obtained (120 mAh/g) is 15–30% lower than $Li(Co,Ni)O_2$ cathodes, and unmodified $LiMn_2O_4$ exhibits an unacceptably high capacity fade. Several researchers have stabilized this spinel by doping with metal or alkali cations (4,5). While the dopants successfully ameliorated the capacity decline, the initial reversible capacity is no better than 115 mAh/g, and the running voltage of the cell is no better than the usual 3.5 V.

Extending the concept of Mn replacement in the spinel, Davidson (6) used >20 mole % Cr and Ni, respectively, and produced 3 V $LiM_xMn_{2-x}O_4$ cathodes that immediately intercalated Li (discharged). Gao (7) discovered that $LiNi_xMn_{2-x}O_4$ has a 4.7 V plateau corresponding to the oxidation of Ni(II), and the capacity of the system $0 \leq x \leq 0.5$ is nearly constant over the range 3.5 to 5.0 V.

The higher potential transition was assigned to $Ni^{+2} \rightarrow Ni^{+4}$ oxidation, with a corresponding $Li^+$ deintercalation. Further, the 4.7 V plateau increased with Ni concentration at the expense of the $Mn^{+3} \rightarrow Mn^{+4}$ 4 V plateau, as predicted, and for $LiNi_{0.5}Mn_{1.5}O_4$, which contains only $Mn^{+4}$, there was no electrochemical activity at 4 V.

Thackeray and Gummow (4) have developed 4 V doped spinel $LiMn_2O_4$ cathode materials of the following composition: $Li_1D_{x/b}Mn_{2-x}O_{4+\delta}$, where the dopant, D, is a mono- or multi-valent metal cation. Both $Mg^{2+}$ and $Co^{3+}$ were claimed as dopants.

More recently, Zhong and Bonakdarpour (5) have developed high voltage (~5 V) doped spinel $LiMn_2O_4$ cathode materials of the following composition: $Li_{x+y}M_xMn_{2-y-z}O_4$, where the dopant, M, is a transition metal. Specific examples of M are nickel and chromium.

However, the existing doped spinel cathode materials manifest unremarkable electrochemical stability leading to poor cycle life. Therefore, a need exists to improve the stability of ultrahigh ($\geq 5$ V) voltage cathode materials and such materials are the subject of this invention. Lithium ion batteries incorporating such materials will outperform existing cell chemistries with respect to running voltage and power densities in particular.

SUMMARY OF THE INVENTION

This invention relates to lithiated transition metal oxide insertion materials in which at least two of the elements are mixed valence or in which Cu is specifically one of the dopant elements. Such materials are particularly useful in high voltage non-aqueous batteries, electrochemical capacitors and superconductivity materials. The improved properties may be ascribed to the unusually high oxidation state of the M-dopant, thereby providing a particle microstructure favoring high Li-cation mobility while minimizing structural degradation of the cathode material.

Specifically, the insertion materials of the invention, as cathode materials, are believed to have an intercalation microstructure that, surprisingly, confers the highly beneficial electrochemical property of minimal capacity fade upon cycling. These materials are very stable at ultrahigh voltage (~4.7–5.1 V) and are, therefore, extremely useful in long-lived rechargeable power sources.

The empirical formula of a preferred embodiment derived from physical and electrochemical evaluations is $LiM_y^{II}M_z^{III}Mn_l^{III}Mn_q^{IV}O_4$ ($0<y+z\leq 0.5$, $y+z+l+q=2$) where M=one or more metals or transition metals which are doped, singly or in combination, with $Mn^{III}$ and $Mn^{IV}$ in the parent $LiMnO_4$ lattice. Also preferred are copper insertion compounds of the formula $LiM_yCu_{0.5-y}Mn_{1.5}O_4$ ($0\leq y\leq 0.49$), where M=one or more doped metals or transition metals.

BRIEF DESCRIPTION OF THE DRAWINGS

A more complete appreciation of the invention may be obtained from a consideration of the following detailed description taken in conjunction with the drawings in which.

DETAILED DESCRIPTION OF THE INVENTION

Figure 1:
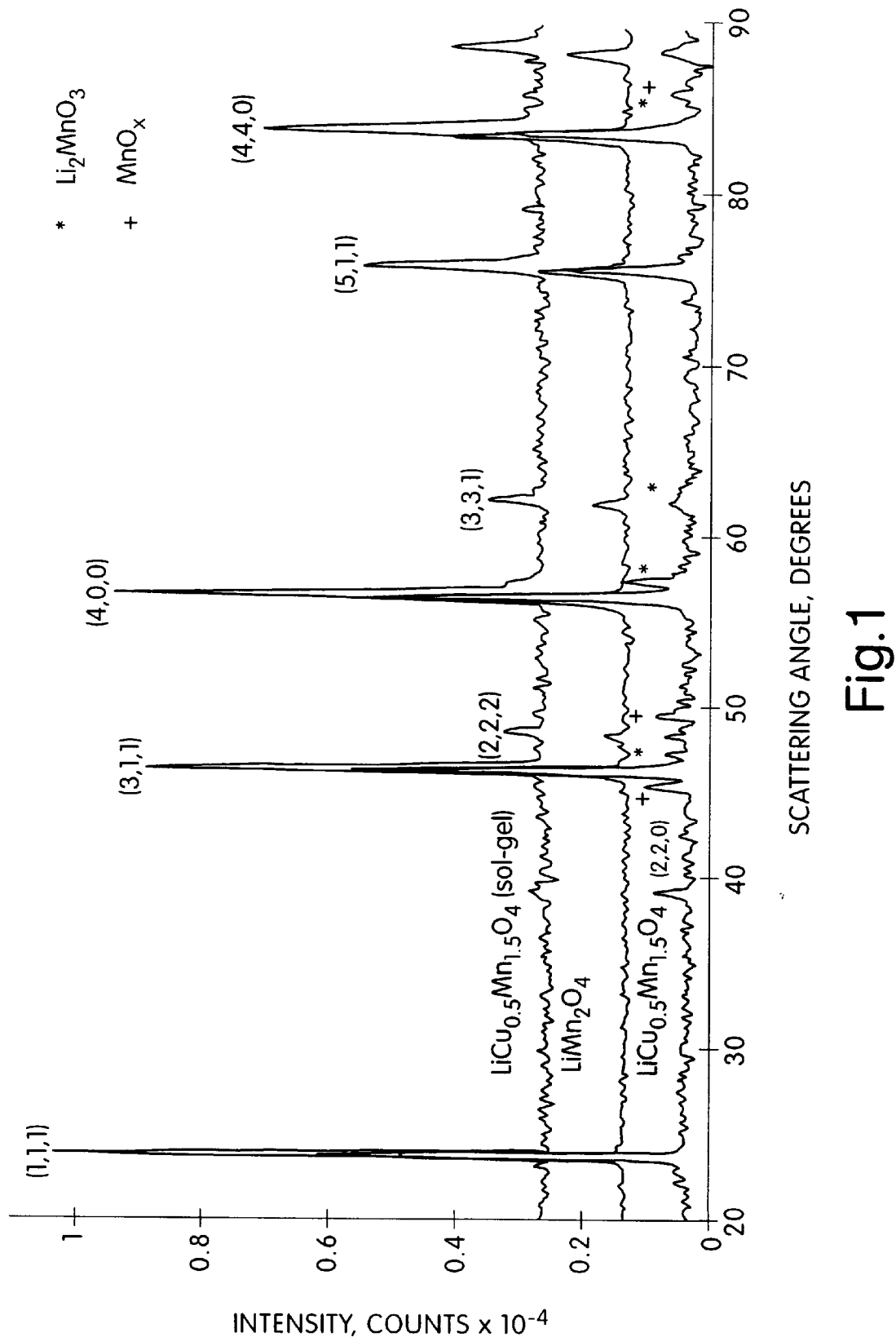
FIG. 1 shows XRD patterns obtained from $LiCu_{0.5}Mn_{1.5}O_4$ spinel prepared by solid state and sol-gel preparation methods, compared to the XRD pattern of unmodified $LiMn_2O_4$ spinel.

The insertion compounds of the invention can be prepared by at least two distinct and complementary processes, a solid state method and a sol-gel method.

Process 1, solid state. A lithium source selected from lithium salts, lithium oxides, lithium hydroxides and mixtures thereof; a manganese source selected from manganese salts, manganese oxides and manganese hydroxides and mixtures thereof, and one or more transition metal sources selected from transitional metal salts, oxides, hydroxides and mixtures thereof, the proportion of lithium to manganese to transition metal(s) being selected to satisfy the stated composition range of the material: LiM$_y^{+2}$M$_z^{+3}$Mn$_l^{+3}$Mn$_q^{+4}$O$_4$ ($0 < y+z \leq 0.5$, y+z+l+q=2). The above reactants are heated in an oxygen containing atmosphere with the reaction temperature and time being calculated to provide the chosen manganese and transition metal oxidation state in the desired insertion compound and to prevent decomposition or disproportionation of the desired insertion compound into undesired products, as detected by powder XRD. For example, LiOH, H$_2$O were mixed with CuO and MnO$_2$ and heated in air from 430° to 470° C. After an appropriate soak period (about 8–10 hours) to allow molten LiOH to infuse the other reactants, the temperature was ramped to 740–770° C. and held at the higher temperature for about 10 hours.

Process 2, sol-gel method. Reactant materials of the desired stoichiometries, as described above for Process 1, underwent a sol-gel reaction wherein the reactants were dissolved in water and base in order to achieve mixing on a molecular level. After water removal, the mixture was heated in an oxygen containing atmosphere with the reaction temperature and time being controlled as in Process 1.

For example, LiO$_2$CCH$_3$, Cu(O$_2$CCH$_3$)$_2$ and Mn(O$_2$CCH$_3$)$_2$ were solubilized in water containing NH$_4$OH. This mixture was stirred with heating and fired to temperatures up to 750° C. after removal of residual water. As in Process 1, it is important to allow for an appropriate soak period at temperatures ranging from 430 to 470° C. prior to raising the temperature to about 750° C.

Electrochemical charge/discharge data for LiNi$_y$Cu$_{0.5-Y}$Mn$_{1.5}$O$_4$ prepared by processes as taught in this disclosure reveal two distinct voltage plateaus at approximately 4.1 and 4.9 V versus Li/Li$^+$. These plateaus are ascribed to the Mn$^{+3}$–Mn$^{+4}$ transition in the 4 V region and the mixed valence M transition in the 5 V region. The lithium insertion materials of this invention are significantly more stable when cycled than materials of similar stoichiometry as disclosed by Zhong et al. in U.S. Pat. No. 5,631,104. For example, over 170 deep cycles are demonstrated by the doped Cu insertion compound of the invention as opposed to only 50 cycles undergone by the Zhong et al. insertion materials. This is a critical advantage with respect to the need for long-lived rechargeable power sources.

The following examples are presented to illustrate the advantages of the present invention and to assist one of ordinary skill in making and using the same. These examples are not intended in any way otherwise to limit the scope of the disclosure.

EXAMPLE I

Synthesis of Mixed Valence LiCu$_x$Mn$_{2-x}$O$_4$

LiCu$_x$Mn$_{2-x}$O$_4$ cathode materials were prepared by conventional solid state and sol-gel methods. In the solid state syntheses, LiOH.H$_2$O was intimately mixed with stoichiometric amounts of CuO and MnO$_2$, soaked for 8–10 hours in air at 450°, then ramped at a rate of 1° per min to 750° C. and held at 750° C. for another 10 hours. The product was free-flowing and did not require milling. The XRD pattern is presented in FIG. 1.

Figure 2:
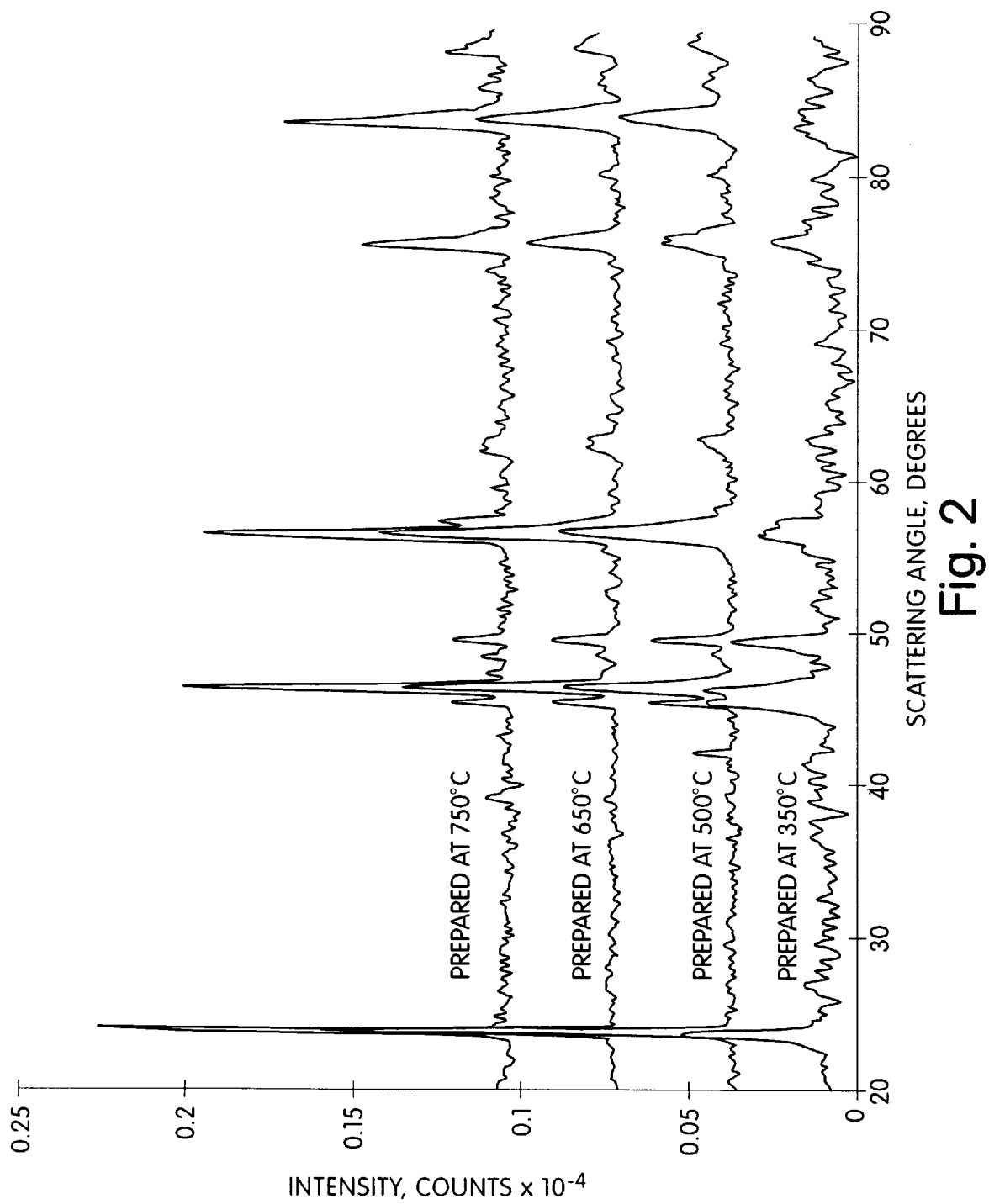
FIG. 2 shows XRD patterns obtained from LiCu$_{0.5}$Mn$_{1.5}$O$_4$ prepared via the sol-gel method at the indicated calcining temperature.

Nearly phase-pure LiCu$_{0.5}$Mn$_{1.5}$O$_4$ was also prepared by a sol-gel process by dissolving stoichiometric amounts of CH$_3$COOLi (Acros), Cu(OOCCH$_3$)$_2$.H$_2$O (Avocado), and Mn(OOCCH$_3$)$_2$ (Aldrich) in deionized water, and adding a 4×molar amount of NH$_4$OH. The mixture was stirred with gentle heating for 2 hours, then concentrated to dryness on a rotary evaporator. The powdered precursor was split into four samples which were heated for 18 hours in air at 350°, 500°, 650°, and 750° C., respectively. FIG. 2 shows the XRD patterns of LiCu$_{0.5}$Mn$_{1.5}$O$_4$ prepared in one calcining at the listed temperatures. Even after 350° C., there is evidence for spinel formation, although Mn$_2$O$_3$ is prevalent and peaks are weak and diffuse due to low crystallinity. As the preparation temperature is increased, XRD signals become sharper and stronger, except the Mn$_2$O$_3$ peaks, which slowly decline. Finally, note that $Li_2MnO_3$ appears only in the 750° C. sample, and the [2,2,0] signal at 390 is strongest in this pattern.

Figure 3:
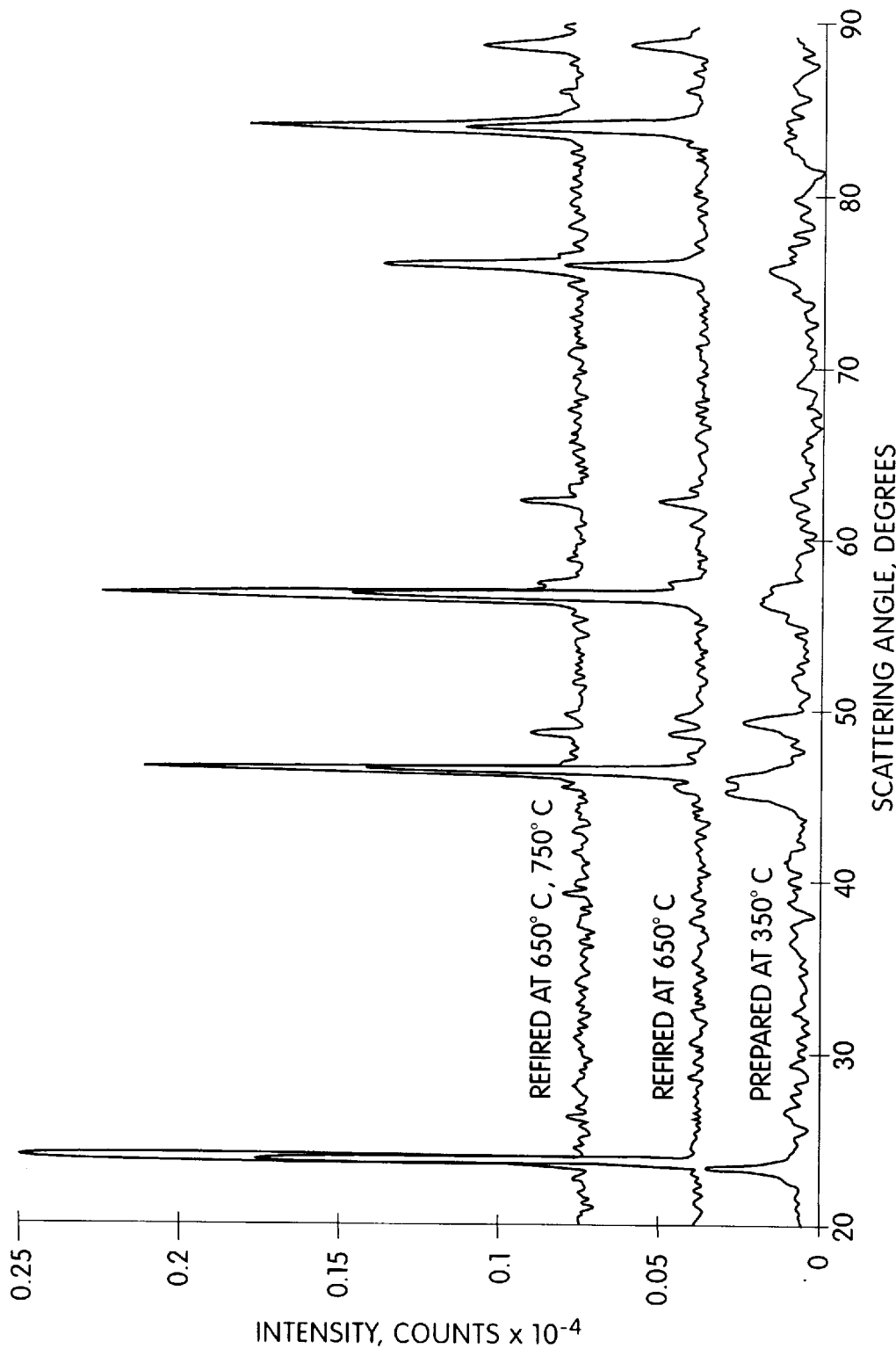
FIG. 3 shows XRD patterns of LiCu$_{0.5}$Mn$_{1.5}$O$_4$ prepared via the sol-gel method with calcining temperature of 350 EC and subsequent refiring temperatures of 650 and 750 EC.
Figure 4:
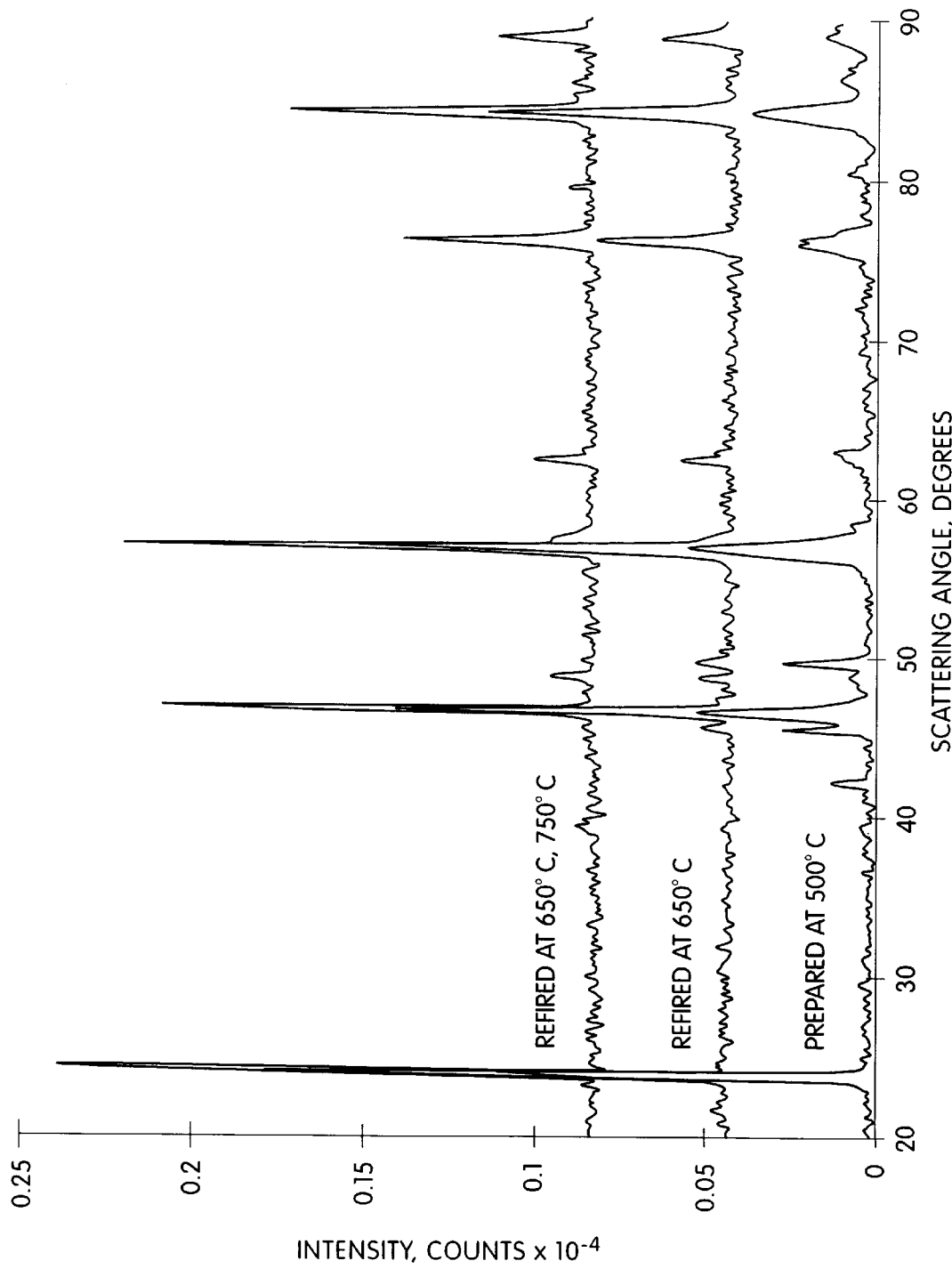
FIG. 4 shows XRD patterns of LiCu$_{0.5}$Mn$_{1.5}$O$_4$ prepared via the sol-gel method with calcining temperature of 500 EC and subsequent refiring temperatures of 650 and 750 EC.

The two Cu-modified spinels prepared at 350° C. and 500° C. were each subsequently refired at 650° and 750° C. XRD patterns of these materials are shown in FIGS. 3 and 4. The 650° C. refiring removed most of the unreacted precursors, but a final 750° C. soak was necessary to complete the reaction. Even so, there were traces of $Li_2MnO_3$ in both materials, although the 500/650/750° C. sequence produced a cleaner product. The initial reaction temperature permits molten LiOH infusion (430 to 470° C.) into the other reactants before the formation of $Li_2MnO_3$ (520 to 550° C.). which is an undesirable product. $LiCu_{0.5}Mn_{1.5}O_4$ prepared in two steps, at 650° and 750° C. had noticeable impurities and a [2,2,0] peak that did not diminish with additional furnace time.

Nearly phase-pure material was obtained from the 500/650/750° C. firing protocol, with a very small [2,2,0] peak in the XRD patterns (FIGS. 1 and 4). This signal, at 39° 2θ in FIG. 1, is proof that some Cu resides on the spinel's tetrahedral sites. Since these 8a sites are generally occupied by Li, a very poor X-ray scatterer, this peak is not usually observed in XRD patterns. Multiple refires of $LiCu_{0.5}Mn_{1.5}O_4$ reduced, but did not eliminate, the [2,2,0] feature. Sol-gel techniques, with essentially atomic-level mixing, produced materials with barely detectable (by XRD) tetrahedral Cu.

As pointed out by Pouchard (8), highly oxidized Cu(III) forms essentially covalent bonds with oxygen, due to extensive mixing of the Cu 3d and O 2p orbitals, and such systems are stabilized by interaction with strongly basic metal oxides (e.g., $Li_2O$).

Figure 5:
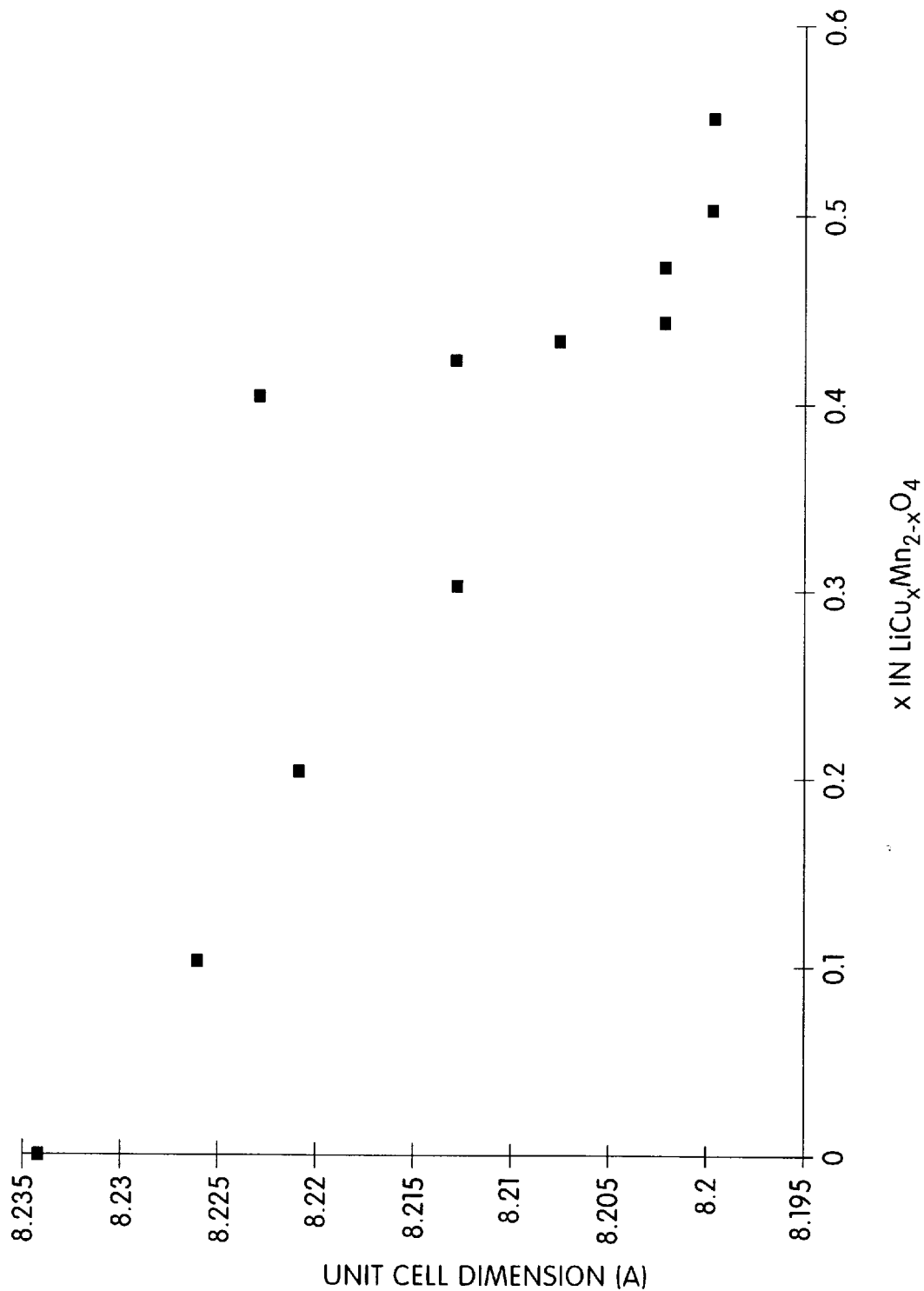
FIG. 5 shows the unit cubic cell dimentsion for LiCu$_x$Mn$_{2-x}$O$_4$ ($0 \leq x \leq 0.55$) as a function of x.

Analysis of the [4,0,0] scattering angle from $LiCu_xMn_{2-x}O_4$ species permits the calculation of the cubic unit cell dimension. The results depicted in FIG. 5 show a linear decline from 8.234 Å (unmodified spinel) to 8.212 Å in $LiCu_{0.3}Mn_{1.7}O_4$, followed by an abrupt transition at x=0.4 to 8.223 Å. The unit cell then quickly shrinks to 8.20 Å with higher Cu content.

EXAMPLE II

Formation of a Favorable Particle Morphology

Figure 6A:
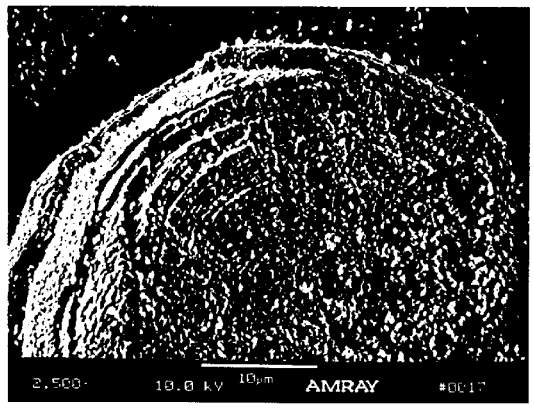
FIGS. 6a–6d show SEM micrographs obtained from LiMn$_2$O$_4$, LiCu$_{0.2}$Mn$_{1.8}$O$_4$, LiCu$_{0.4}$Mn$_{1.6}$O$_4$ and LiCu$_{0.5}$Mn$_{1.5}$O$_4$, respectively.
Figure 6B:
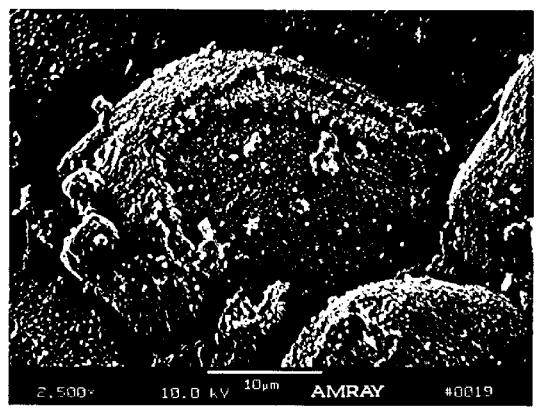

SEM micrographs show a change in internal $LiCu_xMn_{2-x}O_4$ morphology detectable at x=0.4. A sequence of SEM micrographs obtained from the unmodified $LiMn_2O_4$ spinel and the $LiCu_xMn_{2-x}O_4$ series ($0.2 \leq x \leq 0.5$) is presented in FIGS. 6a–6d. The unmodified spinel (FIG. 6a) possesses an onion microstructure with approximately 2 μm ring thickness, while the copper-modified spinels (FIGS. 6b–6d) show ring expansion to 10–15 μm and the formation of a radial microstructure, detectable at x=0.4.

Figure 6C:
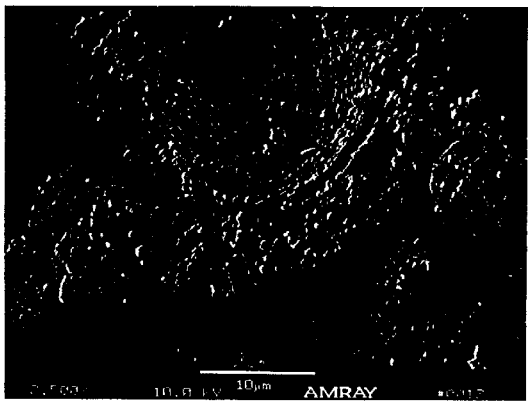
Figure 6D:
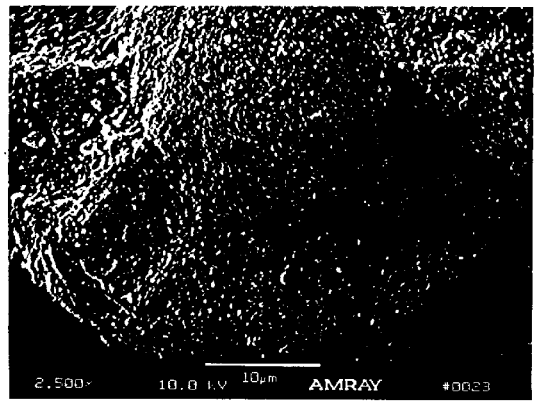

The internal morphology changes observed in the copper-modified spinel particles are a function of the amount of copper (x) introduced into the $LiCu_xMn_{2-x}O_4$ lattice. As will be shown later, increasingly stable cycle life is observed as the copper fraction is increased. Not to be bound by any theory, it is believed that the tightly layered onion structure of $LiMn_2O_4$ is subject to cracking unless the lattice "breathing" from Li intercalation effects is extremely well coordinated; i.e., Li cycling is accomplished at very slow rates. For example, if an outer shell shrinks more rapidly than its nearest inward neighbor, then the resulting compressive forces will eventually split the upper layer. With the inclusion of Cu in the spinel, the nested shells become wider and more diffuse, and as the Cu content rises toward 25 mole %, a radial microstructure appears (FIGS. 6c, d). Not only should this facilitate $Li^+$ transport into the cathode particles, but a radial lattice is more compatible with expansion/contraction cycles. The linkage of the observed radial microstructure in these new materials to enhanced electrochemical stability upon cycling has not been previously disclosed.

EXAMPLE III

Thermogravimetric Analysis

Figure 7:
FIG. 7 shows TGA profiles (30 to 900° C. at 5° C./min. in H$_2$) of LiMn$_2$O$_4$ and LiCu$_{0.5}$Mn$_{1.5}$O$_4$.

The TGA profiles presented in FIG. 7 (30 to 900° C. at 5° C/min, in $H_2$) of $LiMn_2O_4$ vs. $LiCu_{0.5}Mn_{1.5}O_4$ differ substantially in onset temperature and depth of reduction. Unmodified spinel initiates reduction (oxygen loss) at 1400C, and over the following 200°, loses 9.6% of its weight. Following a lengthy period of minimal weight loss, the material further diminishes by 4.6% in the range 820 to 900° C. By calculation, the first reduction corresponds to the removal of one oxygen atom per molecule, resulting in $LiMn_2O_3$ (theoretical weight loss 8.9%). The total loss of 14.2% corresponds to the formation of $LiMn_2O_{2.5}$ ([0.5 * $[Li_2O.4MnO]$), with a theoretical weight drop of 13.3%. Inclusion of Cu in the spinel framework dramatically increases the reactivity; expressed another way, the Cu increases the molecular oxidation potential and makes the species more easily reduced. Onset of weight loss was almost immediate, and by 230° C., the $LiCu_{0.5}Mn_{1.5}O_4$ sample weight had dropped 26%, indicating that the residue had an empirical formula of $LiCu_{0.5}Mn_{1.5}O_{0.75}$ (28% calculated loss). Subsequent heating resulted in an additional 3.5% weight loss, mostly above 750° C., leaving $Li_2O$ and metallic Cu and Mn (theoretical 30.2% weight loss). These results strongly suggest that the mixed valenced Cu and Mn ions enhance electronic delocalization and greatly facilitate electron transfer within the spinel framework, thus leading to the low-temperature reduction of $LiCu_{0.5}Mn_{1.5}O_4$.

EXAMPLE IV

Electrochemical Studies

Figure 8:
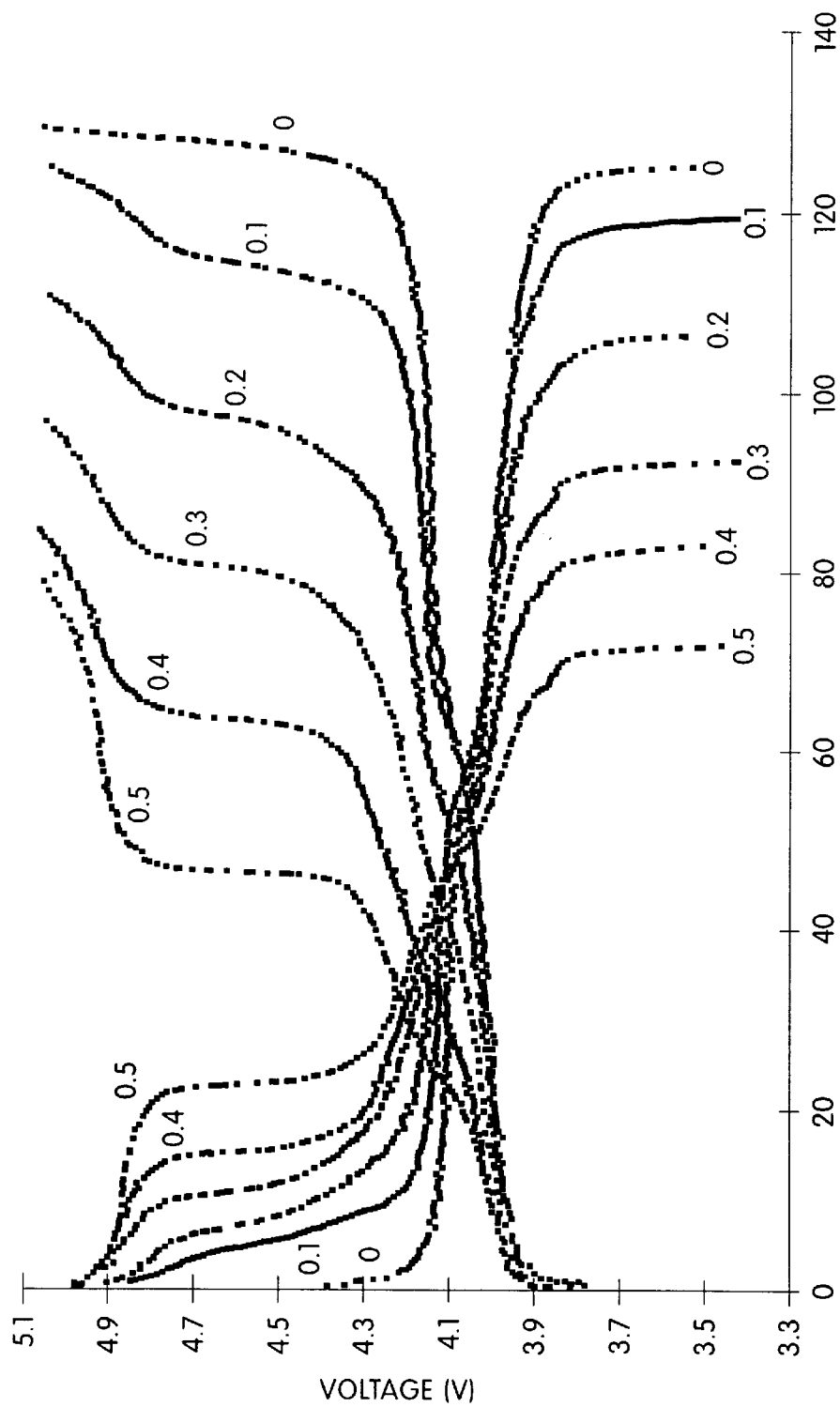
FIG. 8 shows the potential (V)–capacity (mAh/g) curves obtained from the third cycle for LiCu$_x$Mn$_{2-x}$O$_4$ ($0 \leq x \leq 0.5$) in steps of x=0.1; Li metal served as counter electrode in EC(2):DMC(3)/1.2M LiPF$_6$.
Figure 9:
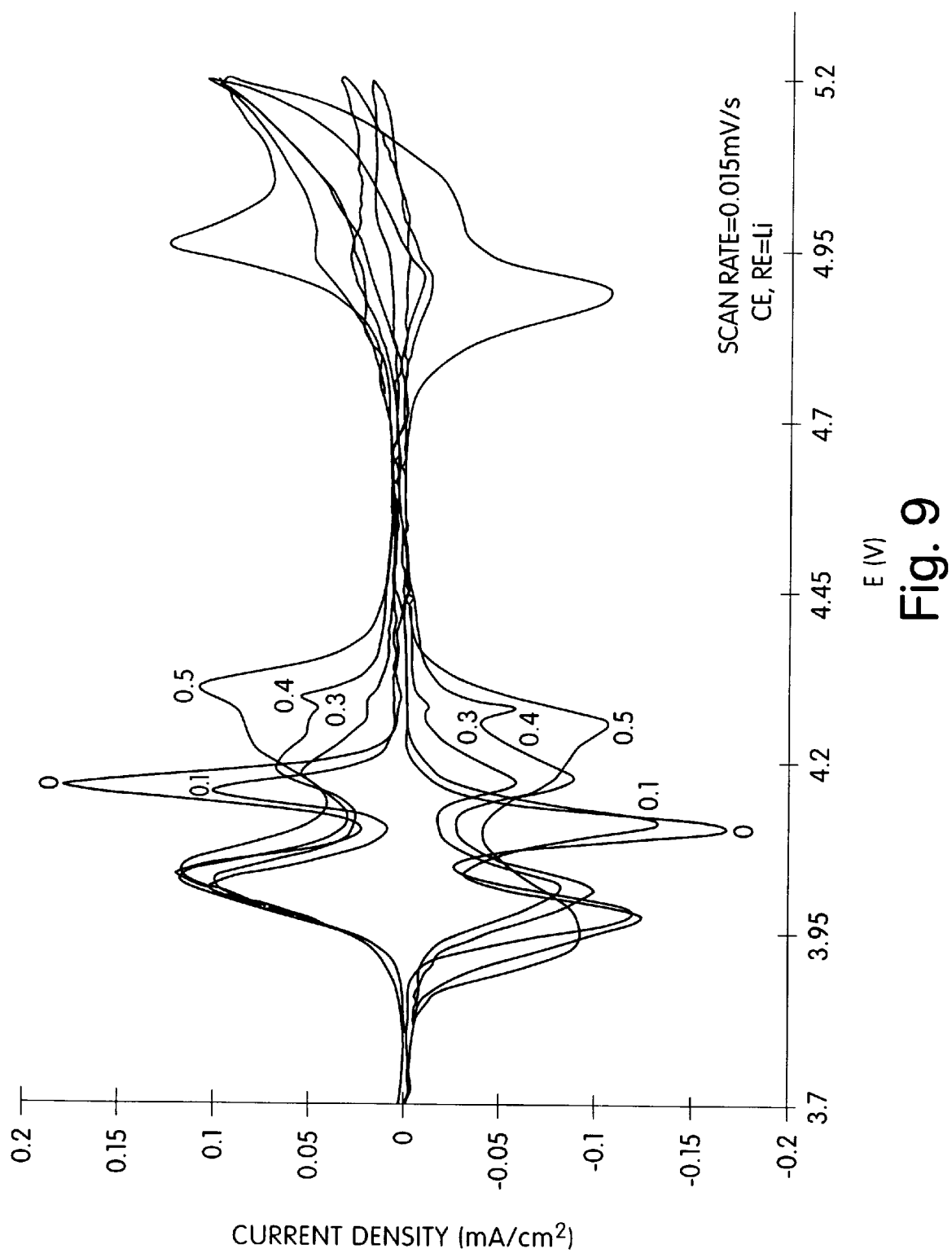
FIG. 9 shows cyclic voltammograms obtained from LiCu$_x$Mn$_{2-x}$O$_4$ (x=0, 0.1, 0.3, 0.4 and 0.5) cycled in the potential limits of 3.75–5.2 V at a scan rate of 15 $\mu$V/s; Li metal served both as counter and reference electrode in EC(2):DMC(3)/1.2M LiPF$_6$.

FIG. 8 and the accompanying Table 1 show potential/capacity curves and values for $LiCu_xMn_{2-x}O_4$, $0 \leq x \leq 0.5$, in steps of x=0.1. The presented curves and the capacity values for each voltage plateau were obtained from the third cycle. Potential limits were 3.3–5.1 V and charge/discharge rates were 0.25 mA/cm². Charge capacity exceeded discharge capacity by 5–10% on the first 10 cycles, attributed to electrolyte oxidation at the higher potentials. Much slower rates were employed for the cyclic voltammograms of the spinel series depicted in FIG. 9. Note that the $LiCu_{0.1}Mn_{1.9}O_4$ curves have the familiar 4/4.1 V discharge transitions, nearly unchanged from the unmodified spinel. As the Cu content of the spinel increases, the 4.1 V peak shifts to 4.25 V, and a new plateau grows in at 4.9 V. Further, the total capacity drops from 119 mAh/g (x=0.1) to 71 mAh/g (x=0.5).

TABLE I

Relative Capacities of Empirical $LiCu_xMn_{2-x}O_4$ Electrodes

| x in $LiCu_xMn_{2-x}O_4$ | Capacity, mAh/g at 5.1–4.5 V | Capacity, mAh/g at 4.5–3.3 V | Cu:Mn Capacity Ratio |
|---|---|---|---|
| 0.1 | 7  | 112 | 1:16 |
| 0.2 | 10 | 96  | 1:10 |
| 0.3 | 13 | 79  | 1:6  |
| 0.4 | 19 | 63  | 1:3  |
| 0.5 | 23 | 48  | 1:2  |

This behavior is substantially different from the electrochemical behavior of transition metal doped Mn spinels as taught by Zhong and Bonakdarpour in U.S. Pat. No. 5,631,109. For example, in FIG. 3 of the aforementioned patent, it is seen that as the amount of transition metal dopant is increased from z=0.1 to z=0.5, the high voltage (~5 V) plateau increases at the expense of the low voltage (~4 V) plateau. Very little of the low voltage plateau is seen to remain at z=0.5. In contrast, FIG. 8 of this invention clearly shows that even at a transition metal doping level of x=0.5, a substantial capacity of the low voltage plateau is electrochemically accessible. These data again demonstrate that the disclosed materials are fundamentally different from those of the prior art and confer an important technological advantage: in situ overcharge protection of the device.

In other words, should one weak cell in a battery comprising a series string of cells with a specified potential of 4 V/cell prematurely reach the limit of its 4 V capacity, the potential of that specific cell will climb to the 5 V plateau. Upon reaching the 5 V plateau, the cell voltage is effectively "clamped" until the other cells on charge in the series string "catch up" to the weak cell. Without in situ overcharge protection afforded by the unique cathode electrochemistry disclosed herein, the potential of the weak cell would rise beyond 5 V until its electrolyte irreversibly oxidized, thereby destroying the cell and subsequently compromising the performance of the entire battery.

It is plain that Cu has two major effects on the spinel electrochemistry, and the key is the atomic environment within the spinel lattice as a function of Cu oxidation state. If $LiCu_{0.5}Mn_{1.5}O_4$ mimicked the Ni analog of Amine (9), the Cu would be a 2+ ion, and all the Mn would be $Mn^{4+}$ to establish molecular neutrality. In this circumstance, there would be no charge capacity in the 3.9–4.3 V region, which originates from $Mn^{3+} \rightarrow Mn^{4+}$ in unmodified spinel. Further, there would be approximately 70 mAh/g of capacity in the 4.9 V transition in accordance with 0.5 Faradays of electrons from $Cu^{2+} \rightarrow Cu^{3+}$. At the other extreme, the species $LiCu^+{}_{0.5}Mn^{+3}{}_{0.5}Mn^{+4}O_4$ could be postulated, likewise producing about 70 mAh/g, but all in the 3.9–4.3 V region. Neither scheme trying to force the compound of EXAMPLE I into a formula with single valence Cu is consistent with the results shown in FIGS. 8 and 9 and the data presented in Table 1. A model for a spinel series that is compatible with the electrochemical data for the compound of this Example should have some content of Cu in a +3 oxidation state. Although this is the first compound reported with two mixed-valence elements, both Mn (in intercalation cathodes) and Cu (in superconductors) are commonly found independently with dual oxidation states.

It is proposed that Cu (II) in the lattice is responsible for the 4.1→4.25 V shift in the upper discharge plateau of the spinel. The 4.9 V plateau is attributed to the oxidation of $Cu^{2+} \rightarrow Cu^{3+}$, but the loss of total capacity with increasing Cu content indicates that not all the Cu in $LiCu_xMn_{2-x}O_4$ is in a +2 state.

Figure 10:
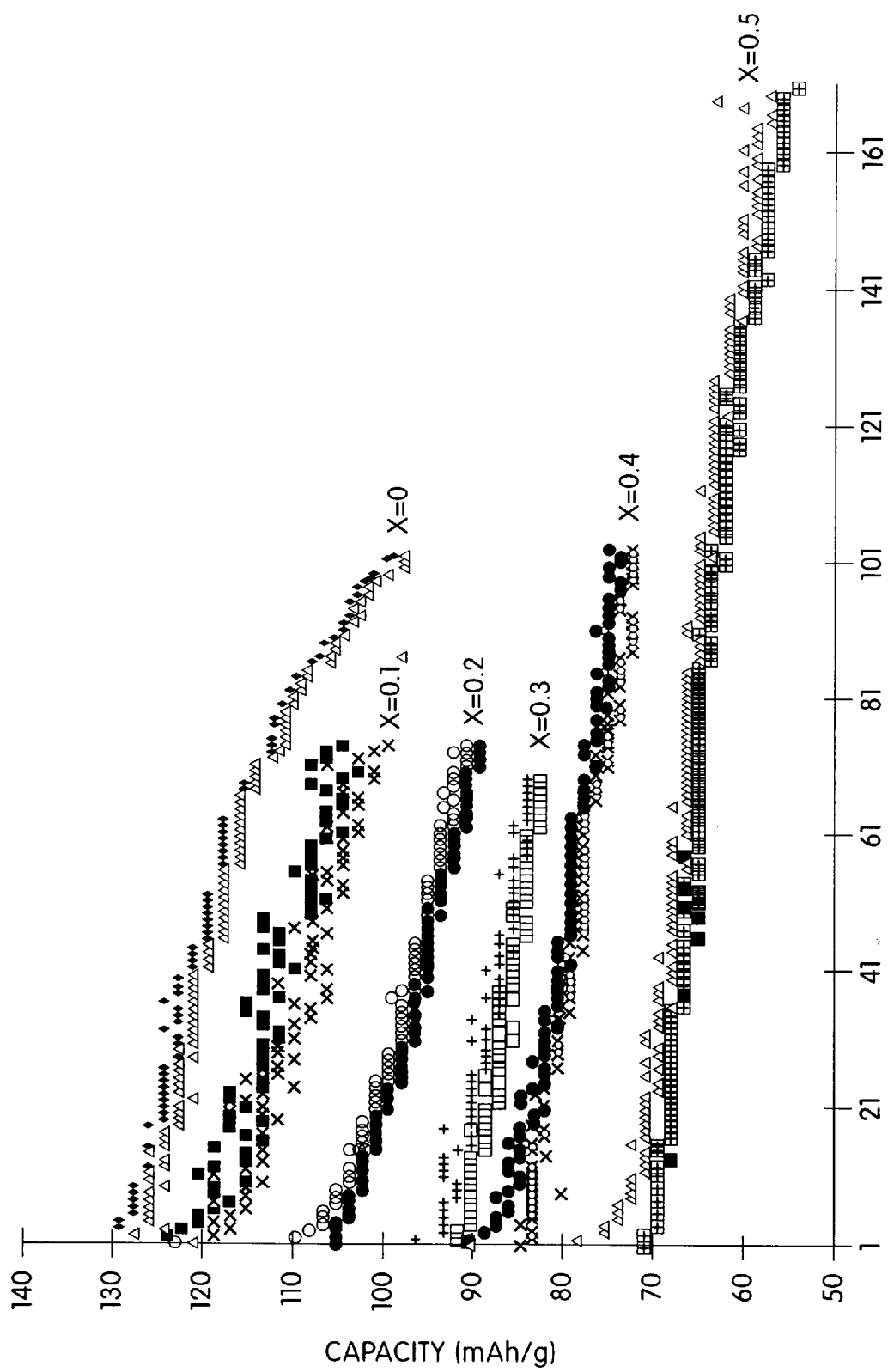
FIG. 10 shows the cycle life behavior (charge/discharge capacity, expressed in mAh/g vs. cycle number) of LiCu$_x$Mn$_{2-x}$O$_4$ ($0 \leq x \leq 0.5$, in steps of x=0.1). Li metal served as a counter electrode in EC(2):DMC(3)/1.2M LiPF$_6$.

FIG. 10 presents the cycle life (charge/discharge capacity, expressed in mAh/g vs. cycle number) of $LiCu_xMn_{2-x}O_4$ ($0 \leq x \leq 0.5$). As the amount of copper in the modified copper spinel increases, capacity fade diminishes, although initial reversible capacity drops substantially. This surprising behavior is ascribed to two factors. As pointed out earlier, the morphological changes observed in FIG. 6 are a result of the highest concentration copper spinel which has a radial microstructure, while the lower Cu content (<15 mole %) spinels retain the onion ring morphology. The radial lattice is structurally suited to minimize particle degradation due to lattice expansion and contraction. This cathode material exhibited the best capacity retention of all the spinel compositions prepared.

EXAMPLE V

Synthesis of $LiZn_{0.5}Mn_{1.5}O_4$ $LiZn_{0.5}Mn_{1.5}O_4$ cathode materials were prepared by conventional solid state processes. Thus, $LiOH.H_2O$ was intimately mixed with stoichiometric amounts of ZnO and $MnO_2$, then heated for 10 hours in air at 450° C., followed by 20 hours firing at 750° C. The product was free-flowing and did not require milling.

EXAMPLE VI

Synthesis of $LiNi_{0.5}Mn_{1.5}O_4$ $LiNi_{0.5}Mn_{1.5}O_4$ cathode materials were prepared by conventional solid state processes. Thus, $LiNi_{0.5}Mn_{1.5}O_4$ was intimately mixed with stoichiometric amounts of NiO and $MnO_2$ then heated for 8 hours in air at 4500C, followed by temperature ramping to 750° C. and heating it at this temperature for 24 hours. The product was free-flowing and did not require milling.

EXAMPLE VII

Synthesis of $LiNi_xCu_{(0.5-x)}Mn_{1.5}O_4$ where x varies from 0.49 to 0.15.

$LiNi_xCu_{(0.5-x)}Mn_{1.5}O_4$ ($0.15 \leq x \leq 0.49$) cathode materials were prepared by the sol-gel method. Stochiometric amounts of $LiO_2CCH_3$, $CU(O_2CCH_3)_2$ $Ni(O_2CCH_3)_2$ and $Mn(O_2CCH_3)_2$ were solubilized in water containing $NH_4OH$. This mixture was stirred with heating and fired to temperatures up to 750° C. after removal of residual water. As in Process 1, it is important to allow for an appropriate soak period at temperatures ranging from 430 to 470° C. prior to raising the temperature to 750° C.

Figure 11:
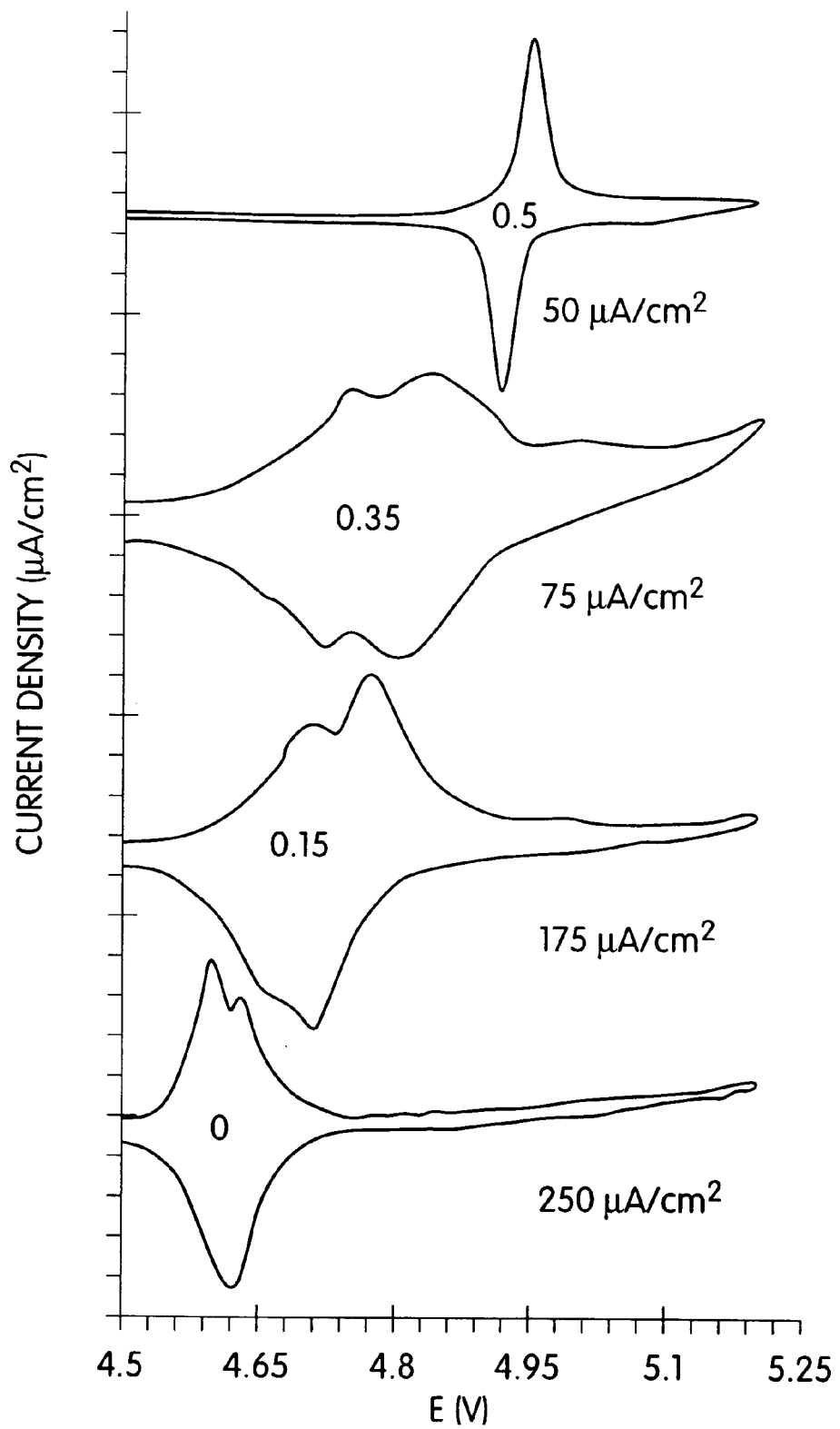
FIG. 11 shows cyclic voltammograms obtained from LiNi$_x$Cu$_{(0.45-x)}$Mn$_{1.5}$O$_4$ ($0 \leq x \leq 0.5$) cycled in the potential limits of 3.75–5.2 V at a scan rate of 15 $\mu$V/s; Li metal served both as the counter and reference electrode in EC(1):MC(3)/1.0M LiPF$_6$.
Figure 12:
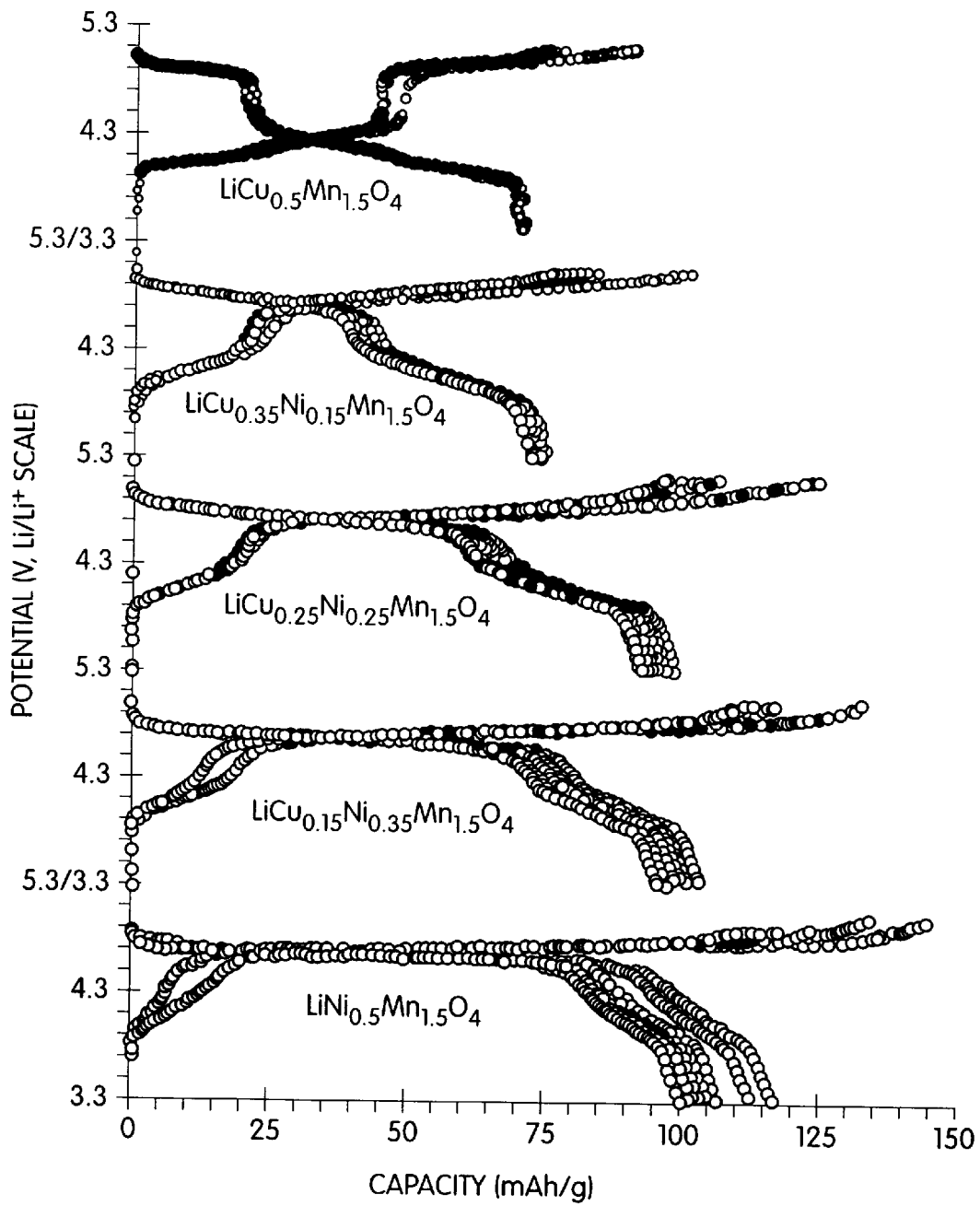
FIG. 12 shows the potential (V)–capacity (mAh/g) curves obtained from electrochemical cell utilizing LiNiCu0.01 as cathode material; LiNi$_x$Cu$_{(0.5-x)}$Mn$_{1.5}$O$_4$ as cathode materials; Li metal served as the counter electrode in EC(1):EMC(3)/1.0M LiPF$_6$.
Figure 13:
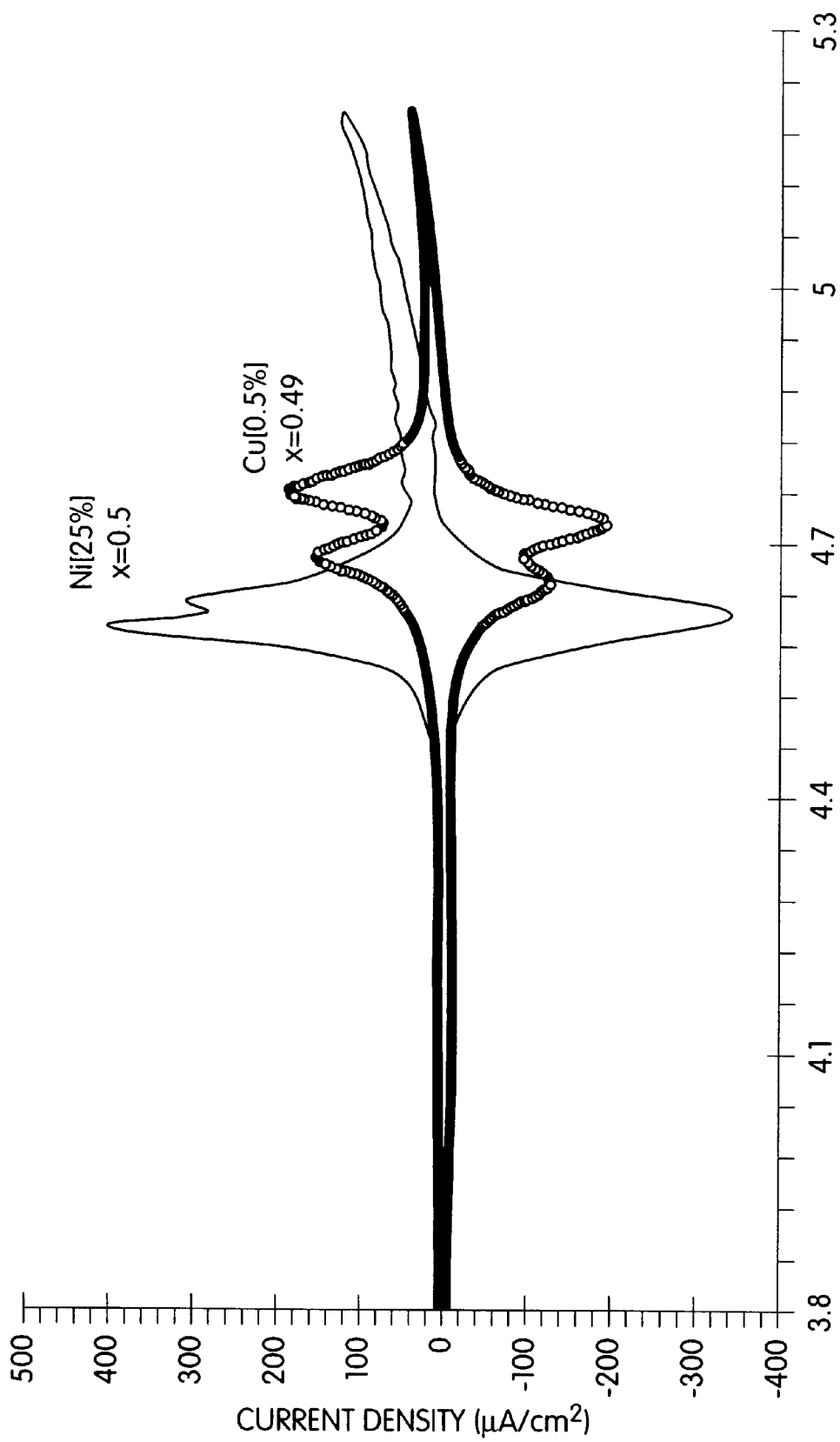
FIG. 13 shows the cyclic voltammograms obtained from LiNi$_{0.49}$Cu$_{0.01}$Mn$_{1.5}$O$_4$ and LiNi$_x$Cu$_{(0.5-x)}$Mn$_{1.5}$O$_4$ cycled in the potential limits of 3.75–5.2 V at a scan rate of 15 $\mu$V/s; Li metal served both as the counter and reference electrode in EC(1):EMC(3)/1.0M LiPF$_6$.

A series of binary transition metal doped Mn spinels were synthesized and electrochemically evaluated. The cyclic voltammetries presented in FIG. 11 revealed the significant shifts in the potential peak positions as a function of the amount of Cu introduced into the cathod material matrix. The potential (V) capacity (mAh/g) curves obtained from cycling the various $LiNi_xCu_{(0.5-x)}Mn_{1.5}O_4$ cathode materilas are presented in FIG. 12. The various potential plateaus and discharge capacities are collected in Table 2 and are compared to the mono-doped $LiNi_{0.5}Mn_{1.5}O_4$ and $LiCu_{0.5}Mn_{1.5}O_4$. Quite surprisingly, the addition of only 0.5 atomic percent of Cu (x=0.49) to the $LiNi_{0.5}Mn_{1.5}O_4$ spinel lattice was found to shift the $Ni^{+2}$ to $Ni^{+4}$ oxidative transition from 4.6 to 4.7 V, as shown in FIG. 13. Significantly larger additions of Cu to the Ni/Mn spinel lattice only marginally increased the potential of the high voltage plateau. These results show how a judicious use of binary transition metal dopant ratios allows one to easily "tune" the high voltage plateau to, for example, match the redox characteristics of a particular electrolyte. Additionally, the ability to fine tune the potential of the upper voltage plateau also allows the battery engineer to precisely design the appropriate overcharge protection voltage "clamp" for a specific application. It can be seen that in general, a higher concentration of Ni in the lattice leads to a higher discharge capacity in the upper potential and, therefore, a higher energy battery. In contrast, a higher Cu concentration leads to a higher voltage at the upper plateau and, therefore, higher power.

TABLE II

| Cathode Material | Potential Plateaus (V) | | Discharge Capacity (mAh/g) | | |
|---|---|---|---|---|---|
| | Lower | Upper | Total | Lower Potential | Upper Potential |
| $LiCu_{0.5}Mn_{1.5}O_4$ | 4.15 | 4.9 | 71 | 47 | 24 |
| $LiCu_{0.35}Ni_{0.15}Mn_{1.5}O_4$ | 4.1 | 4.8 | 75 | 25 | 50 |
| $LiCu_{0.25}Ni_{0.25}Mn_{1.5}O_4$ | 4.1 | 4.75 | 100 | 21 | 79 |
| $LiCu_{0.15}Ni_{0.35}Mn_{1.5}O_4$ | 4.1 | 4.7 | 104 | 17 | 87 |
| $LiNi_{0.5}Mn_{1.5}O_4$ | 4.1 | 4.6 | 117 | 12 | 105 |

While the present invention has been described in conjunction with a preferred embodiment, one of ordinary skill, after reading the foregoing specification, will be able to effect various changes, substitutions of equivalents, and other alterations to the compositions and methods set forth herein.

REFERENCES

1. J. B. Goodenough, D. G. Wickham, and W. J. Croft, *J. Phys. Chem. Solids*, 5, 107 (1958).
2. K. Mizushima, P. C. Jones, P. J. Wiseman, and J. B. Goodenough, *Mat. Res. Bull.*, 15, 783 (1980).
3. M. M. Thackeray, *Progress in Batteries and Battery Materials*, Vol. 14, R. J. Brodd, ed., ITE Press, Inc., Brunswick, Ohio, p.1 (1995), and references therein.
4. Thackeray and Gummow, U.S. Pat. No. 5,316,877, 1994.
5. Zhong and Bondakdarpour, U.S. Pat. No. 5,631,104, 1997.
6. I. J. Davidson, R. S. McMillan, and J. J. Murray, U.S. Pat. No. 5,370,949, 1994.
7. Y. Gao, K. Myrtle, M. Zhang, J. N. Reimers, and J. R. Dahn, *Phys. Rev. B*, 54, 3878 (1996).
8. M. Pouchard, Y. J. Shin, J. P. Doumerc, and P. Hagenmuller, *Eur. J. Solid State Inorg. Chem.*, 28, 461 (1991).
9. K. Amine, H. Tukamoto, H. Yasuda, and Y. Fujita, 188th Electrochem. Soc. Meeting, Chicago, Ill. 8–13 October 1995; K. Amine, H. Tukamoto, H. Yasuda, and Y. Fujita, *J. Electrochem. Soc.*, 143, 1607 (1996).

What is claimed is:

1. A lithium insertion compound of the formula $LiM_y^{II}M_z^{III}Mn_l^{III}Mn_q^{IV}O_4$, wherein $0<y+z \leq 0.5$; $y+z+l+q=2$; $y,z,l,q \neq 0$; and M=two or more metals or transition metals.

2. The lithium insertion compound of claim 1 wherein M comprises Cu.

3. The lithium insertion compound of claim 1 wherein M is Cu plus at least one additional metal or transition metal selected from the group consisting of Ni, Zn, Cr, Fe, and Mg.

4. A lithium battery comprising
   a lithium anode;
   an electrolyte comprising a solvent and a lithium salt; and
   a cathode of the formula $LiM_y^{II}M_z^{III}Mn_l^{III}Mn_q^{IV}O_4$, wherein $0<y+z \leq 0.5$; $y+z+l+q=2$; $y,z,l,q \neq 0$; and M=two or more metals or transition metals.

5. The lithium battery of claim 4, wherein the lithium anode is carbonaceous.

6. A lithium battery at 4.7–5.1 V, said battery comprising
   a lithium anode;
   an electrolyte comprising a solvent and a lithum salt; and
   a cathode employing the active lithium insertion compound of claim 1.

7. A lithium insertion compound of the formula $LiM_yCu_{0.5-y}Mn_{1.5}O_4$ ($0<y \leq 0.49$) where M=one or more metals or transition metals.

8. The lithium insertion compound of claim 7 wherein M is selected from the group consisting of Ni, Zn, Cr, Fe and Mg.

9. The lithium insertion compound of claim 8 wherein M is Ni.

10. The lithium insertion compound of claim 8 wherein M is more than one metal or transition metal from said group.

11. The lithium insertion compound of claim 7 wherein Cu is present at a doping level of from 0.1 atomic percent to 25 atomic percent.

12. The lithium insertion compound of claim 7 wherein Cu is present at a doping level of from 0.5 atomic percent to 25 atomic percent.

13. A lithium battery comprising
   a lithium anode;
   an electrolyte comprising a solvent and a lithium salt; and
   a cathode of the formula $LiM_yCu_{0.5-y}Mn_{1.5}O_4$ ($0<y \leq 0.49$) where M=one or more metals or transition metals.

14. The lithium battery of claim 13, wherein the lithium anode is carbonaceous.

15. A lithium battery at 4.7–5.1 V, said battery comprising
   a lithium anode;
   an electrolyte comprising a solvent and a lithum salt; and
   a cathode employing the active lithium insertion compound of claim 7.

* * * * *

UNITED STATES PATENT AND TRADEMARK OFFICE
CERTIFICATE OF CORRECTION

PATENT NO. : 5,962,166
DATED : October 5, 1999
INVENTOR(S) : Yair Ein-Eli, et al.

It is certified that error appears in the above-identified patent and that said Letters Patent is hereby corrected as shown below:

Title page,
Item [57] Abstract,

Line 1, "$M_2^{II}$", should read -- $M_2^{III}$ --;
Line 2, "$_1Mn_1^{III}$", should read -- $MN_1^{III}$ --;

Column 3,
Line 34, "MC(3) /1.0M", should read -- EMC(3)1.0M --;

Column 4,
Line 47, "$LiOH.H_2O$", should read -- $LiOH \cdot H_2O$ --;
Line 55, "$Cu(OOCCH_3)_2.H_2O$", should read -- $Cu(OOCCH_3)_2 \cdot H_2O$ --;

Column 5,
Line 2, "390", should read -- 39° --;
Lines 20 21, "2θin", should read -- 2θ in --;

Column 6,
Line 20, "1400C,", should read -- 140°C, --;
Line 27, "$[Li_2O.4MnO])$", should read -- $[Li_2O \cdot 4MnO])$ --;

Column 7,
Lines 49-50, "$LiCu^+{}_{30.5}Mn^{+4}O_4$", should read
-- $LiCu^{+3}{}_{0.5} MN^{+3}{}_{0.5} Mn^{+4}O_4$ --;

UNITED STATES PATENT AND TRADEMARK OFFICE
CERTIFICATE OF CORRECTION

PATENT NO. : 5,962,166
DATED : October 5, 1999
INVENTOR(S) : Yair Ein-Eli, et al.

It is certified that error appears in the above-identified patent and that said Letters Patent is hereby corrected as shown below:

<u>Column 8,</u>
Line 21, "LiOH.H$_2$O", should read -- LiOH•H$_2$O --; and
Line 33, "4500C,", should read -- 450°C, --.

Signed and Sealed this

Sixteenth Day of October, 2001

Attest:

NICHOLAS P. GODICI
Attesting Officer
Acting Director of the United States Patent and Trademark Office